G. W. & O. HENDERSON.
CORN HARVESTING MACHINE.
APPLICATION FILED JULY 11, 1913.
1,103,766.
Patented July 14, 1914.
3 SHEETS—SHEET 3.
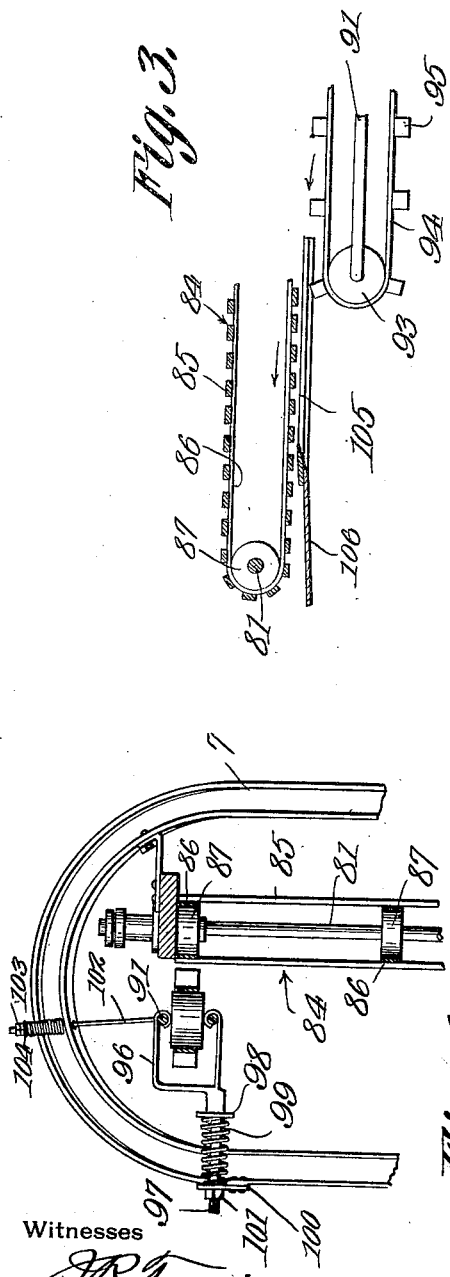
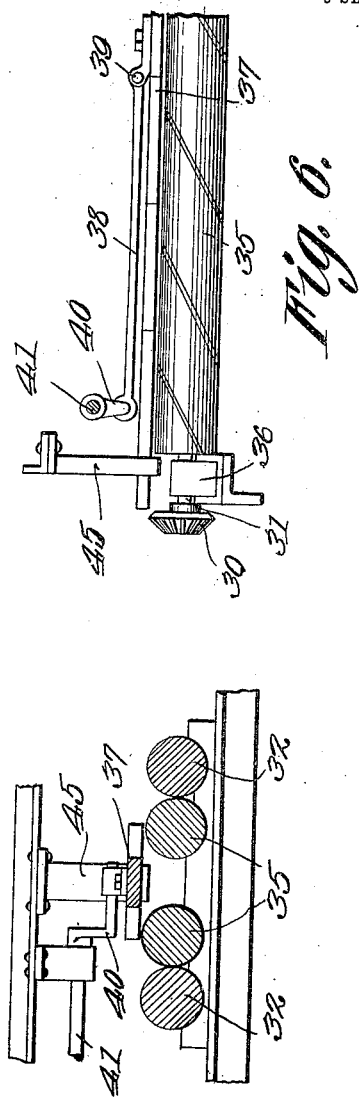
George W. Henderson
Olen Henderson
Inventors,
by C. A. Snow & Co.
Attorneys.
Witnesses

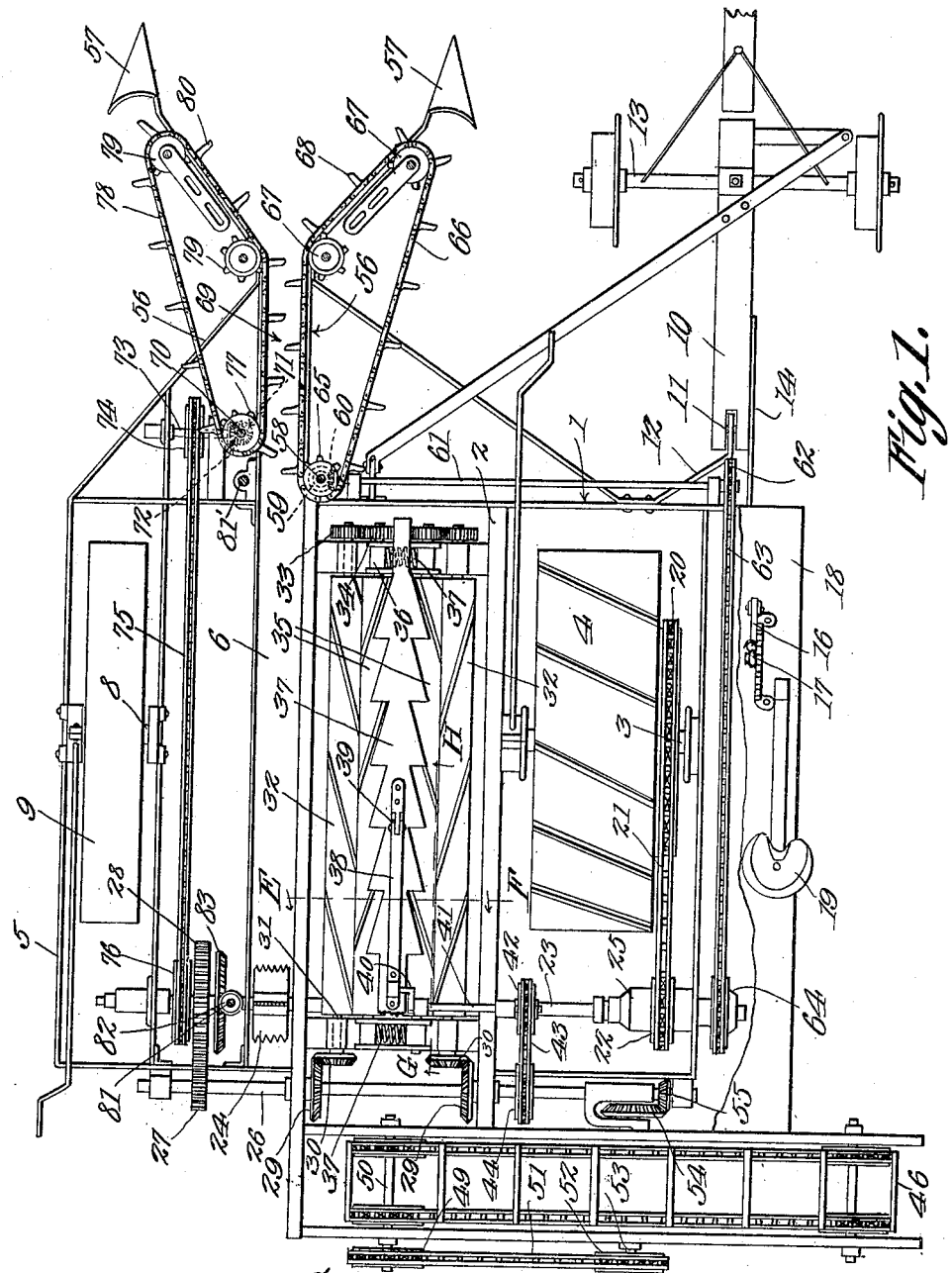

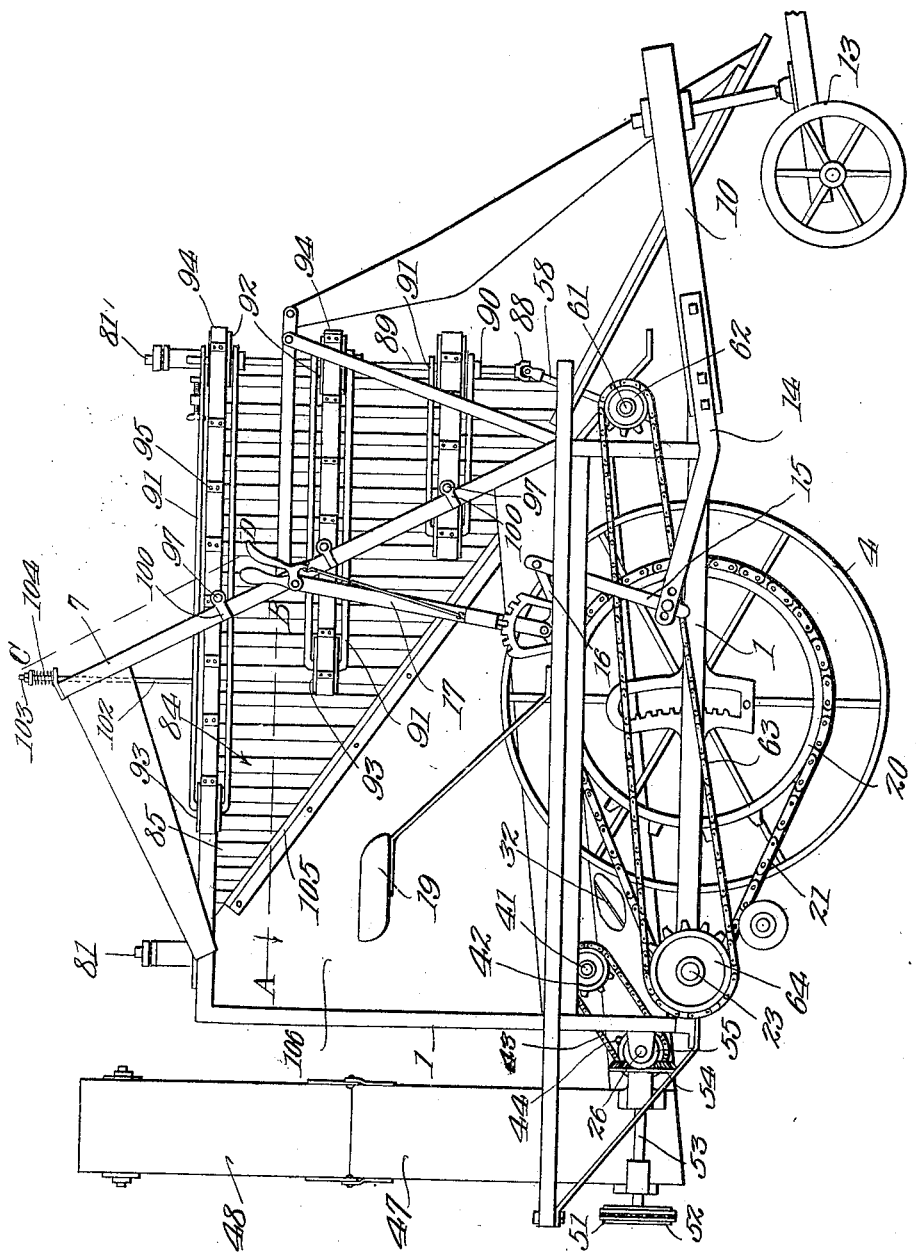

UNITED STATES PATENT OFFICE.

GEORGE W. HENDERSON AND OLEN HENDERSON, OF RIDGE FARM, ILLINOIS.

CORN-HARVESTING MACHINE.

1,103,766.  Specification of Letters Patent.  Patented July 14, 1914.

Application filed July 11, 1913. Serial No. 778,623.

*To all whom it may concern:*

Be it known that we, GEORGE W. HENDERSON and OLEN HENDERSON, citizens of the United States, residing at Ridge Farm, in the county of Vermilion, State of Illinois, have invented a new and useful Corn-Harvesting Machine, of which the following is a specification.

This invention relates to machines for gathering and husking corn, one of its objects being to provide a machine of this character which is provided with improved means for removing the ears from the stalks without danger of dropping the ears upon the ground before they are husked.

A further object is to provide improved means for properly holding the stalks relative to the snapping mechanism while the ears are being removed.

A further object is to provide improved means for feeding the ears to the husking rolls.

Another object is to provide a machine of this character which can be adjusted quickly so as to act upon stalks of different heights.

Another object is to provide a machine of this character which is light and durable in construction and easy to manipulate.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine with the stripping or snapping mechanism removed. Fig. 2 is a side elevation. Fig. 3 is a section on line A—B Fig. 2. Fig. 4 is a section on line C—D Fig. 2. Fig. 5 is a section on line E—F Fig. 1. Fig. 6 is a section on line G—H Fig. 1.

Referring to the figures by characters of reference 1 designates the main frame of the structure, the same being divided by a longitudinal beam 2 and there being a main axle 3 mounted in one side of the frame 1 and in the beam 2 so as to be supported by the main supporting and drive wheel 4.

The main frame 1 has a side extension 5 spaced from one side of the frame 1 except at the back thereof so as thus to form a stalk receiving passage 6. The extension frame may be suitably braced relative to the frame 1 in any suitable manner, as by means of one or more arches 7. In the present instance one of these arches has been shown, the same being inclined upwardly and rearwardly from the front portion of frame 1 and its extension 5 and projecting over the passage 6 near the rear portion thereof. An axle 8 is secured in the extension frame 5 directly opposite the axle 3 and is supported by a wheel 9.

A draft tongue 10 is pivotally connected, as at 11, to a bracket 12 extending forwardly from one side portion of the frame 1 and this tongue may be mounted, at any desired point, upon a truck 13 of any suitable construction. An arm 14 extends rearwardly from the tongue and is fixedly connected thereto, this arm being connected, by a link 15, to an arm 16 extending from the lower end of an adjusting lever 17 mounted upon a platform 18 which is supported along the outer side of frame 1. The driver's seat 19 is supported above the platform 18 at a point adjacent lever 17. Any suitable means may be provided for locking the lever in any position to which it may be adjusted. Obviously, by swinging lever 17 the arm 14 can be raised or lowered and, as the tongue 10 is pivotally connected to the bracket 12 extending forwardly from frame 1, it will be seen that this swinging of arm 14 will result in raising or lowering the front end portion of the frame 1.

A sprocket 20 rotates with the drive wheel 4 and transmits motion, through a chain 21, to a sprocket 22 loosely mounted on a drive shaft 23 which is journaled upon and extends transversely of the rear portion of frame 1 and its side extension 5, this shaft being extended across the passage 6 close to the back end of the passage. That portion of the shaft 23 within the passage is provided with toothed means 24 constituting beaters whereby the stalks, when brought into contact with the blades, are driven downwardly toward the ground, thus to permit the machine to pass readily over them.

A suitable clutch 25 is carried by shaft 23 and by means thereof the sprocket 22 can be coupled to or uncoupled from the shaft 23. Thus it will be seen that by manipulating this clutch, the machine can be propelled over the ground without causing the actuation of the mechanism hereinafter described, or, when desired, the rotation of the wheel 4 will result in the actuation of said mechanism.

A counter shaft 26 is journaled upon the rear end portion of frame 1 and its extension 5 and has a gear 27 which receives motion, through a gear 28, from the drive shaft 23. This counter shaft 26 is provided with oppositely disposed beveled gears 29 meshing with beveled gears 30 secured to necks 31 extending rearwardly from husking rolls 32. These husking rolls are mounted in the frame 1 between the passage 6 and the beam 2 and the front ends of said husking rolls 32 are provided with gears 33 meshing with corresponding gears 34 secured to the front ends of additional husking rolls 35. These husking rolls are journaled in slidable boxes 36, there being springs 37 interposed between the boxes so as thus to press the rolls 35 against the adjacent rolls 32. Thus the husking rolls are arranged in two pairs, the rolls of each pair rotating in opposite directions so as to coöperate and grip the husks and force them downwardly between the rolls in the usual manner.

Suitably supported above the space between the husking rolls 35 is a spreading strip 37 in the form of a plurality of wedges placed end to end so that substantially toothed side edges are thus provided. A pitman 38 is pivotally connected, as at 39, to the spreading strip 37 and is also connected to the crank 40 of a shaft 41 extending above shaft 23 and provided with a sprocket 42. This sprocket receives motion, through a chain 43, from another sprocket 44 secured to the counter shaft 26. Obviously, when shaft 41 is rotated, the spreading strip 37 will be reciprocated in the guides provided therefor. One of these guides has been illustrated at 45 in Figs. 5 and 6. Obviously it is preferred to have a guide of this type at each end of the spreading strip so that the said strip will be properly guided during its reciprocation.

Extending transversely of the machine at the rear of main frame 1 is an endless elevator 46 preferably supported within a structure made up of a lower stationary section 47 and an upper hinged section 48, said upper section being adapted to fold laterally and downwardly onto the lower section 47 when the elevator is not in use. This endless elevator is adapted to receive motion through a sprocket 49 secured to the shaft 50 at the lower end of the elevator. This sprocket is engaged by a chain 51 which, in turn, receives motion from a sprocket 52 secured to a shaft 53. Said shaft has a gear 54 meshing with another gear 55 secured to the counter shaft 26. Thus during the rotation of shaft 26 the elevator will be operated continuously.

As shown in Fig. 2 the husking rolls are inclined downwardly and rearwardly so that ears discharged therefrom will be directed into the lower end portion of the section 47 where they will be engaged and elevated by the conveyer or elevator 46.

Extension frames 56 extend forwardly from the frames 1 and 5 at opposite sides of the passage 6 and the front end portions of these extension frames 56 diverge forwardly and terminate in dividers 57. An upstanding shaft 58 is journaled at the rear end of the extension frame 56 projecting from frame 1 and has a bevel gear 59 which meshes with a gear 60 secured to a transverse shaft 61. This shaft receives motion through a sprocket 62, chain 63 and sprocket 64, from the drive shaft 23. A sprocket 65 rotates with shaft 58 and gear 59 and drives a gathering chain 66, said chain being extended around guiding sprockets 67 whereby one flight of the chain is extended along the inner side of the extension frame 56 and up to the divider 57. The chain has outstanding fingers 68 for engaging the stalks and gathering them into the passage extension 69 formed between the extension frames 56.

An upstanding shaft 70 is supported by the extension frame 56 located in front of the frame 5 and mounted upon the lower portion of this shaft 70 is a gear 71 which receives motion, through a gear 72, from a shaft 73. A sprocket 74 is secured to this shaft and is engaged by a chain 75 which, in turn, receives motion from a sprocket 76 secured to the shaft 23. A sprocket 77 rotates with the gear 71 and engages a gathering chain 78 similar to the chain 66 and which is extended around the guide sprockets 79 carried by the extension frame 56. Thus the gathering chain is brought close to the outer divider 57. This gathering chain has fingers 80 extending horizontally therefrom. Obviously by providing the gathering chains described and by providing the described mechanism for actuating them, the two gathering chains will be simultaneously actuated in opposite directions so that those flights thereof extending along the sides of the passage extension 69, will be moved rearwardly toward the passage 6 during the forward movement of the machine, thus coöperating to gather the stalks into the passage 6.

A vertical shaft 81 is supported by the rear portion of the frame 5 and close to the passage 6 and receives motion, through gears 82 and 83 from the drive shaft 23. This vertical shaft 81 drives an endless apron 84 made up of flexibly connected vertical slats such as shown in Fig. 2, the said slats, which have been indicated at 85, being attached to chains 86, these chains engaging sprockets 87 secured to the shaft 81. The endless apron extends around a shaft 81' and may be supported and guided at its lower edge by any suitable means provided for that purpose. The inner flight of this apron 84 is extended along the adjacent side of the passage 6.

Connected to the upstanding shaft 58 by means of a universal joint 88 is a vertical shaft 89 which is parallel with shaft 70 and located directly opposite thereto, the passage extension 69 being extended between the two shafts. Secured to the shaft 89 are collars 90 constituting supports for elongated bail-like frames 91 adapted to swing horizontally upon the shaft 89 without, however, interfering with the rotation of the shaft. These frames extend obliquely across the passage 6 so that the apron 84 and the frames will converge rearwardly. The lowermost frame 91 is shorter than the next adjoining frame thereabove while the uppermost frame 91 is longer than any of the others. Secured to shaft 89 within each of the frames 91 is a pulley 92 and journaled upon the remote end of each frame 91 is another pulley 93. A belt 94 is mounted upon each pair of pulleys and has cleats 95 extending transversely thereof. Each frame 91 has a laterally projecting U-shaped extension 96 from which projects a stem 97. This stem has a collar 98 constituting an abutment for a spring 99 which is coiled about the stem, the other end of the spring bearing against a guide plate 100 in which the stem is slidably mounted. Thus the spring serves to hold the frame 91 pressed yieldingly toward the apron 84, as will be apparent by referring to Fig. 4. The movement of the frame 91 toward the apron can be limited by a nut 101 adjustably engaging the stem 97. The uppermost frame 91 which is of considerable length, is preferably yieldingly supported adjacent its free end by a rod 102 extending slidably through the arch 7 and having a head 103 at its upper end bearing downwardly on a cushioning spring 104. Extending obliquely across the inner vertical side of the apron 84 is a stationary knife 105 arranged along the front inclined edge of a deflecting board 106, this board overhanging the adjacent husking roll 32.

It will be apparent from the foregoing description that when the machine is propelled forward, if the sprocket 22 is coupled to shaft 23, motion will be transmitted from wheel 4 to the drive shaft 23 and thus distributed to the several shafts constituting the mechanism of the machine. For example shaft 26 will drive the husking rolls in the manner hereinbefore described and the shafts 58 and 70 will be driven by the mechanisms provided therefor. As the inner flight of the apron 84 travels rearwardly and as those flights of the belts 94 nearest apron 84 likewise travel rearwardly, it will be apparent that as the standing stalks are gathered into the passage 6 by the chains 66 and 78, they will pass between the belts and the apron. Thus the belts will press the stalks tightly against the apron and as the machine continues to move forward the stalks will gradually be positioned between the apron and the blade 105. The said blade will thus snap the ears off of the stalks and said ears will be deflected by the board 106 onto the rolls 32 and 35 and upon the strip 37. As this strip is continually reciprocating during the operation of the machine it will be seen that the toothed sides of the strip will operate to spread the ears laterally so as to deposit them upon the two pairs of husking rolls 32 and 35, thus preventing any of the ears from becoming lodged in the space between the rolls 35. The ears will be husked by the rolls and will then gravitate downwardly into the section 47 of the elevator from which they will be conveyed upwardly and discharged by the elevator 46. After the stalks have been stripped of the ears, they will come against the beating blades 24 and thus be driven downwardly so that the machine will pass readily over them. The blade 105 is fixedly mounted as hereinbefore described but any suitable means can be provided for adjusting it toward or from the apron so as to adapt the machine for use in connection with stalks of different thicknesses.

What is claimed is:—

1. A corn harvesting machine including gathering devices forming a stalk receiving space therebetween, an endless apron arranged vertically and extending rearwardly at one side of said space, the active flight of the apron being movable rearwardly, and a snapping blade extending upwardly adjacent and coöperating with the active face of the apron, said blade being fixed, and means for actuating the apron.

2. A corn harvesting machine including gathering devices forming a stalk receiving space therebetween, an endless apron arranged vertically back of said space, the active flight of the apron being movable rearwardly, an upwardly and rearwardly inclined snapping blade extending close to and coacting with the active face of the apron, and means for deflecting ears laterally from the blade.

3. A corn harvester including gathering devices, a snapping apron having its active flight normally vertical and movable rearwardly from the gathering devices, an upwardly and rearwardly inclined snapping blade adjacent to and coöperating with the active face of the apron, and yielding means for pressing stalks against the apron in advance of the blade.

4. A corn harvester including gathering devices, a snapping apron having its active flight normally vertical and movable rearwardly from the gathering devices, an upwardly and rearwardly inclined snapping blade adjacent to and coöperating with the active face of the apron, and endless means for holding stalks against the apron in advance of the blade.

5. A corn harvester including gathering devices, a snapping apron having its active flight normally vertical and movable rearwardly from the gathering devices, an upwardly and rearwardly inclined snapping blade adjacent to and coöperating with the active face of the apron, endless means for engaging stalks and holding them against the apron in advance of the blade, and means for simultaneously moving rearwardly the adjacent flights of the apron and said endless stalk engaging means.

6. A corn harvester including gathering devices forming a stalk receiving space therebetween, oppositely moving gathering chains carried by the respective devices for directing stalks into said space, a vertical snapping apron extending rearwardly from the gathering devices, the active flight of the apron being movable rearwardly from said devices, an upwardly and rearwardly inclined snapping blade adjacent to and coöperating with the active flight of the apron, and means for actuating the apron.

7. A corn harvester including gathering devices forming a stalk receiving space therebetween, oppositely moving gathering chains carried by the respective devices for directing stalks into said space, a vertical snapping apron extending rearwardly from the gathering devices, the active flight of the apron being movable rearwardly from said devices, an upwardly and rearwardly inclined snapping blade adjacent to and coöperating with the active flight of the apron, and means for actuating the apron, said apron consisting of spaced parallel slats, and flexible connections between the slats.

8. A corn harvester including a snapping apron having vertical slats movable rearwardly, an upwardly and rearwardly inclined snapping blade coöperating with the rearwardly moving flight of the apron, means for directing standing stalks into the space between the apron and the blade, and means for actuating the apron.

9. A corn harvester including a vertical snapping apron, means for actuating the apron to move the active flight thereof rearwardly, a fixed snapping blade coacting with the active flight of the apron, said blade lying in a plane parallel with the active flight of the apron, said blade being inclined upwardly and rearwardly, and yielding means for pressing standing stalks against the apron in advance of the blade.

10. In a corn harvester the combination with a vertical snapping apron and means for propelling the apron to move its active flight rearwardly, of a snapping blade extending across the active flight of the apron and coöperating therewith, elongated means in advance of the blade and inclined rearwardly toward the active flight of the apron for engaging stalks, and means for pressing said stalk engaging means yieldingly toward the apron.

11. A corn harvester including a vertical snapping apron, means for actuating the same, a snapping blade fixedly mounted and extending across the active flight of the apron, means for directing stalks while in their standing positions into the space between the apron and blade, said means including an endless belt mounted to swing horizontally, and means for pressing the belt yieldingly toward the apron.

12. A corn harvester including a vertical snapping apron, means for actuating the same, a snapping blade fixedly mounted and extending across the active flight of the apron, means for directing stalks while in their standing positions into the space between the apron and blade, said means including an endless belt mounted to swing horizontally, means for pressing the belt yieldingly toward the apron, and means for actuating the belt to propel the active flight thereof in the same direction as the active flight of the apron.

13. A corn harvester including a vertical snapping apron, means for actuating the same, a stationary snapping blade extending across the active flight of the apron and coöperating therewith, means for directing standing stalks into the space between the blade and apron, husking rolls, and means for deflecting the detached ears from the blade and onto the rolls.

14. A corn harvester including a vertical snapping apron, means for actuating the same, a stationary snapping blade extending across the active flight of the apron and coöperating therewith, means for directing standing stalks into the space between the blade and apron, husking rolls, means for deflecting the detached ears from the blade and onto the rolls, and an elevator for receiving ears from the husking rolls.

15. A corn harvester including a vertical snapping apron, means for actuating the same, a stationary snapping blade extending across the active flight of the apron and coöperating therewith, means for directing standing stalks into the space between the blade and apron, husking rolls, means for deflecting the detached ears from the blade and onto the rolls, and ear spreading means movably mounted above the husking rolls.

16. A corn husker including a vertical snapping apron, a snapping blade extending upwardly and rearwardly across the active flight of the apron, means for directing standing stalks into the space between the blade and apron, and a revoluble beater below and back of said space.

17. A corn harvester including a structure having a stalk receiving passage, a vertical snapping apron at one side of the passage, means for actuating the apron, an upwardly and rearwardly inclined snapping blade fixedly mounted above the passage and co-operating with the active flight of the apron, and a revoluble stalk beater mounted within the passage and back of the blade.

In testimony that we claim the foregoing as our own, we have hereto affixed our signatures in the presence of two witnesses.

GEORGE W. HENDERSON.
OLEN HENDERSON.

Witnesses:
MILO LARRANCE,
EVERETT C. SMITH.

Copies of this patent may be obtained for five cents each, by addressing the "Commissioner of Patents, Washington, D. C."